United States Patent
Kim

(10) Patent No.: US 8,184,593 B2
(45) Date of Patent: May 22, 2012

(54) CALL SWITCHING SYSTEM AND METHOD OF CONNECTING CALL THEREIN

(75) Inventor: Jae Min Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 12/473,611

(22) Filed: May 28, 2009

(65) Prior Publication Data
US 2009/0298486 A1    Dec. 3, 2009

(30) Foreign Application Priority Data

May 28, 2008    (KR) ..................... 10-2008-0049502

(51) Int. Cl.
*H04W 4/00*    (2009.01)
(52) U.S. Cl. ........................................ 370/331
(58) Field of Classification Search .............. None
See application file for complete search history.

(56) References Cited

U.S. PATENT DOCUMENTS
2008/0188207 A1*    8/2008    Lee .......................... 455/414.1
* cited by examiner

*Primary Examiner* — Raj Jain
(74) *Attorney, Agent, or Firm* — Jefferson IP Law, LLP

(57) ABSTRACT

A call switching system having a plurality of mobile terminals, each having individual identification information for connecting a call, and a method of connecting a call therein are provided. The method includes displaying, by a second mobile terminal, when a call is connected between a first mobile terminal and the second mobile terminal, previously stored identification information, transmitting, by the second mobile terminal, if one of the displayed identification information is selected, the selected identification information to the first mobile terminal, and releasing, by the first mobile terminal, when the selected identification information is received, the connected call and connecting another call using the received identification information. Therefore, in a call switching system, a mobile terminal can connect a call through another mobile terminal.

21 Claims, 9 Drawing Sheets

CALL SWITCHING SYSTEM AND METHOD OF CONNECTING CALL THEREIN

PRIORITY

This application claims the benefit under 35 U.S.C. §119 (a) of a Korean patent application filed on May 28, 2008 in the Korean Intellectual Property Office and assigned Serial No. 10-2008-0049502, the entire disclosure of which is hereby incorporated by reference.

BACKGROUND OF THE INVENTION

1. Field of the Invention

The present invention relates to a mobile communication system and a method of communicating therein. More particularly, the present invention relates to a call switching system having a plurality of mobile terminals each having individual identification information for connecting a call and a method of connecting a call therein.

2. Description of the Related Art

In general, a mobile communication system includes a plurality of mobile terminals. As a mobile terminal includes various functions, the mobile terminal performs a complex function. The various functions may include a message transmission and reception function, a wireless Internet function, a phonebook management function, a schedule management function, a navigation function, a communication function, and the like. In such a mobile communication system, each mobile terminal includes intrinsic identification information. The mobile terminal makes a call to a counterpart mobile terminal using the identification information of the counterpart mobile terminal. Further, the mobile terminal may manage a plurality of identification information through a phonebook management function. In order for the mobile terminal to connect a call, a user of the mobile terminal may input identification information to the mobile terminal, or may retrieve the identification information previously stored in the mobile terminal.

However, in the mobile communication system, if the user of the mobile terminal does not remember certain identification information, or if identification information is not stored in the mobile terminal, it is difficult for the user to make a call. Further, if the user of the mobile terminal is not aware of how to search for the identification information using a phonebook management function, it is also difficult for the user to make a call.

SUMMARY OF THE INVENTION

An aspect of the present invention is to address at least the above-mentioned problems and/or disadvantages, and to provide at least the advantages described below. Accordingly, an aspect of the present invention is to provide a call switching system having a plurality of mobile terminals each having individual identification information for connecting a call and a method of connecting a call therein.

In accordance with an aspect of the present invention, a method of connecting a call in a call switching system, which includes a plurality of mobile terminals each having individual identification information for connecting a call, is provided. The method includes displaying, by a second mobile terminal, when a call is connected between a first mobile terminal and the second mobile terminal, previously stored identification information, transmitting, by the second mobile terminal, if one of the displayed identification information is selected, the selected identification information to the first mobile terminal, and releasing, by the first mobile terminal, when the selected identification information is received, the connected call and connecting another call using the received identification information.

In accordance with another aspect of the present invention, a method of connecting a call in a call switching system, which includes a plurality of mobile terminals each having individual identification information for connecting a call, is provided. The method includes transmitting, by a first mobile terminal, when a call is connected between the first mobile terminal and a second mobile terminal, a plurality of identification information stored in the first mobile terminal to the second mobile terminal, storing, by the second mobile terminal, when the plurality of identification information is received, the received identification information, displaying, by the second mobile terminal, the stored identification information, transmitting, by the second mobile terminal, if one of the displayed identification information is selected, the selected identification information to the first mobile terminal, and releasing, by the first mobile terminal, when the selected identification information is received, the connected call and connecting another call using the received identification information.

In accordance with another aspect of the present invention, a call switching system having a plurality of mobile terminals each having individual identification information for connecting a call is provided. The system includes a first mobile terminal for releasing, when a call is connected to a second mobile terminal, if identification information is received from the second mobile terminal, connection of the call and for connecting another call using the received identification information, the second mobile terminal for displaying, when the call is connected to the first mobile terminal, previously stored identification information, and for transmitting, if one of the displayed identification information is selected, the selected identification information to the first mobile terminal, and a third mobile terminal for connecting the other call from the first mobile terminal.

In accordance with another aspect of the present invention, a call switching system having a plurality of mobile terminals each having individual identification information for connecting a call is provided. The system includes a first mobile terminal for storing a plurality of identification information, for transmitting, when a call is connected to a second mobile terminal, the plurality of identification information, for releasing, when a selected one of the plurality of identification information is received from the second mobile terminal, connection of the call, and for connecting another call using the received identification information, the second mobile terminal for storing and displaying, when the call is connected to the first mobile terminal, the plurality of identification information received from the first mobile terminal, and for transmitting, if one of the displayed identification information is selected, the selected identification information to the first mobile terminal, and a third mobile terminal for connecting the other call from the first mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted to for clarity and conciseness.

In the following description, the term "identification information" denotes information individually allocated to each mobile terminal in a call switching system in order to identify the mobile terminal. In the call switching system, the mobile terminal connects a call using another mobile terminal's identification information. Such identification information may be, for example, a phone number. The mobile terminal can manage the identification information as phonebook data through a phonebook management function.

The term "update information" denotes information generated when at least a part of identification information previously stored in the mobile terminal is updated. The update information includes updated identification information and information including an addition, adjustment, or deletion of corresponding identification information. When adjusting the identification information, the update information includes identification information before and after updating.

The term "switching mobile terminal" denotes a mobile terminal in the call switching system that performs a function as an intermediate device for connecting a call between other mobile terminals. That is, the switching mobile terminal provides stored identification information to another mobile terminal.

The term "providing mobile terminal" denotes a mobile terminal in the call switching system that connects a call using identification information provided from the switching mobile terminal.

Figure 1:
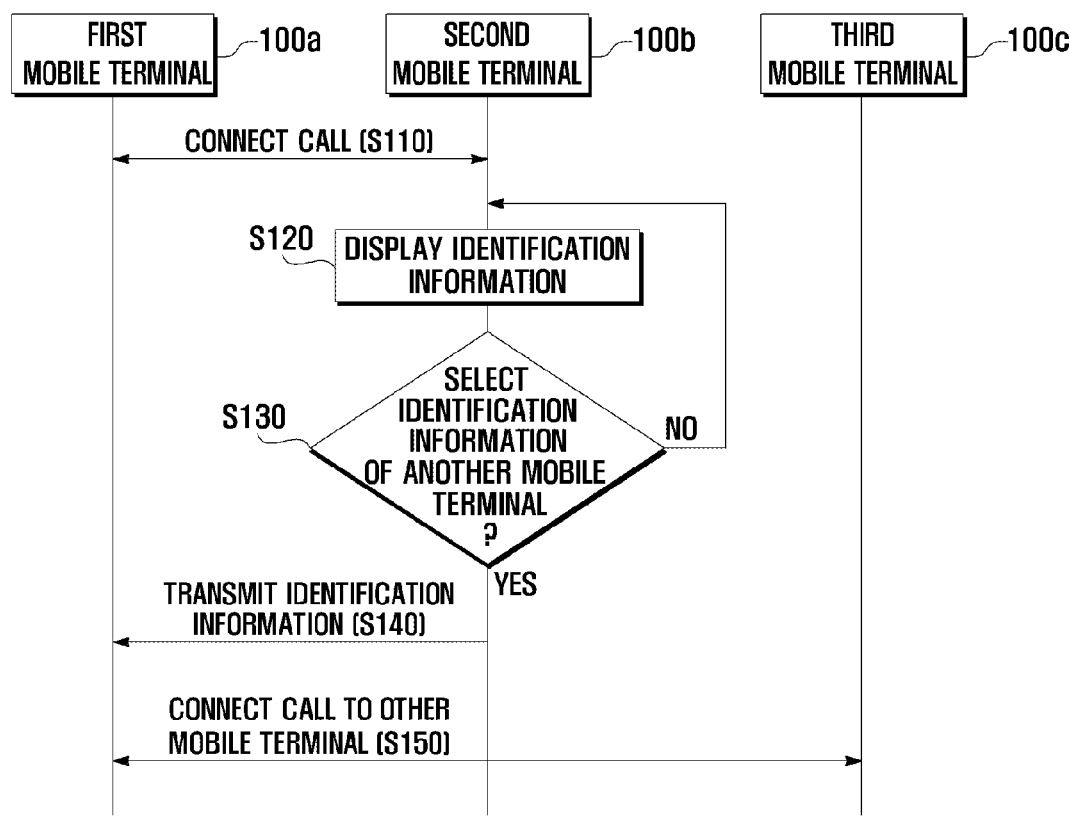
FIG. 1 is a diagram illustrating a method of connecting a call in a call switching system according to an exemplary embodiment of the present invention.

FIG. 1 is a diagram illustrating a method of connecting a call in a call switching system according to an exemplary embodiment of the present invention.

Referring to FIG. 1, a call switching system includes a plurality of mobile terminals, including a first mobile terminal 100a, a second mobile terminal 100b, and a third mobile terminal 100c. The first to third mobile terminals 100a, 100b, and 100c each have individual identification information. In the call switching system in this exemplary embodiment, the first mobile terminal 100a is a providing mobile terminal and the second mobile terminal 100b is a switching mobile terminal.

When a call is connected between the first mobile terminal 100a and the second mobile terminal 100b in step S110, the second mobile terminal 100b displays stored identification information in step S120. In this case, a user of the first mobile terminal 100a may request identification information of the third mobile terminal 100c from a user of the second mobile terminal 100b through voice communication.

A controller of the second mobile terminal 100b determines whether the identification information of the third mobile terminal 100c is selected by the user of the second mobile terminal 100b in step S130. If the identification information of the third mobile terminal 100c is selected, the controller of the second mobile terminal 100b transmits the identification information of the third mobile terminal 100c to the first mobile terminal 100a in step S140.

The first mobile terminal 100a then connects another call to the third mobile terminal 100c using the identification information of the third mobile terminal 100c received from the second mobile terminal 100b in step S150. In this case, when the identification information of the third mobile terminal 100c is received from the second mobile terminal 100b, the first mobile terminal 100a releases the call connected to the second mobile terminal 100b.

In the call switching system according to an exemplary embodiment, the first mobile terminal 100a may connect a call to the third mobile terminal 100c using the second mobile terminal 100b. Accordingly, even if the user of the first mobile terminal 100a does not remember the identification information of the third mobile terminal 100c, or is not aware of how to search for identification information using a phonebook management function, or if the identification information of the third mobile terminal 100c is not stored in the first mobile terminal 100a, the first mobile terminal 100a may connect a call to the third mobile terminal 100c using the identification information of the third mobile terminal 100c received from the second mobile terminal 100b.

Operations to be performed in each mobile terminal of the call switching system according to an exemplary embodiment are described in detail as follows.

Figure 2:
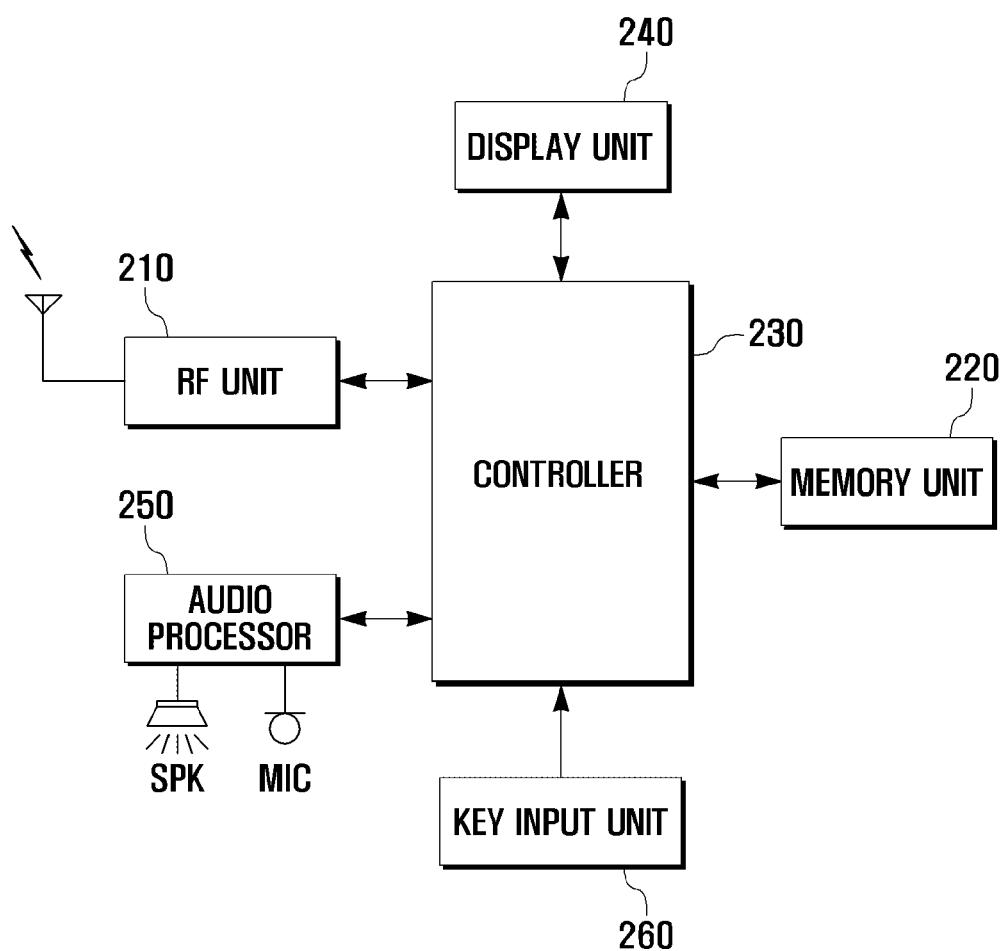
FIG. 2 is a block diagram illustrating a configuration of a first mobile terminal in a call switching system according to an exemplary embodiment of the present invention.

FIG. 2 is a block diagram illustrating a configuration of a first mobile terminal 100a in a call switching system according to an exemplary embodiment of the present invention.

In this exemplary embodiment, the first mobile terminal 100a denotes a mobile phone.

Referring to FIG. 2, the first mobile terminal 100a includes a Radio Frequency (RF) unit 210, a memory unit 220, a controller 230, a display unit 240, an audio processor 250, and a key input unit 260.

The RF unit 210 performs a wireless communication function of the first mobile terminal 100a. The RF unit 210 includes an RF transmitter (not shown) for up-converting a frequency of a signal to be transmitted and amplifying the signal, and an RF receiver (not shown) for low-noise amplifying a received signal and down-converting a frequency of the signal.

The memory unit 220 includes a program memory and a data memory. The program memory stores programs for controlling general operations of the mobile terminal 100. In this exemplary embodiment, the program memory stores programs for connecting a call using identification information provided from the switching mobile terminal. The data memory performs a function of storing data generated while performing programs. The memory unit 220 stores an identification information database including a plurality of identification information.

The controller 230 performs a function of controlling general operations of the first mobile terminal 100a. The controller 230 includes a data processor having a transmitter for encoding and modulating a signal to be transmitted and a receiver for demodulating and decoding a received signal. The data processor includes a modem and a codec. The codec includes a data codec for processing packet data and an audio codec for processing an audio signal such as a voice. In this exemplary embodiment, the controller 230 controls an operation of a providing mobile terminal. That is, when the providing mobile terminal receives identification information of another mobile terminal while connecting a call to the switching mobile terminal, the controller 230 controls to release the call connected to the switching mobile terminal and to connect another call to the other mobile terminal using the received identification information thereof.

The display unit 240 displays user data output from the controller 230. The display unit 240 may use a Liquid Crystal Display (LCD). In this case, the display unit 240 includes an LCD controller, a memory unit for storing image data, and an LCD display element. If the LCD is operated with a touch screen method, the LCD may be used as an input unit.

The audio processor 250 performs a function of reproducing an audio signal received from the audio codec of the data processor through a speaker SPK, and of transmitting an audio signal generated in a microphone MIC to the audio codec of the data processor.

The key input unit 260 includes keys for inputting numeral and character information and function keys for performing various functions. In this exemplary embodiment, the key input unit 260 includes a switch request key for connecting a call to the switching mobile terminal.

Figure 3:
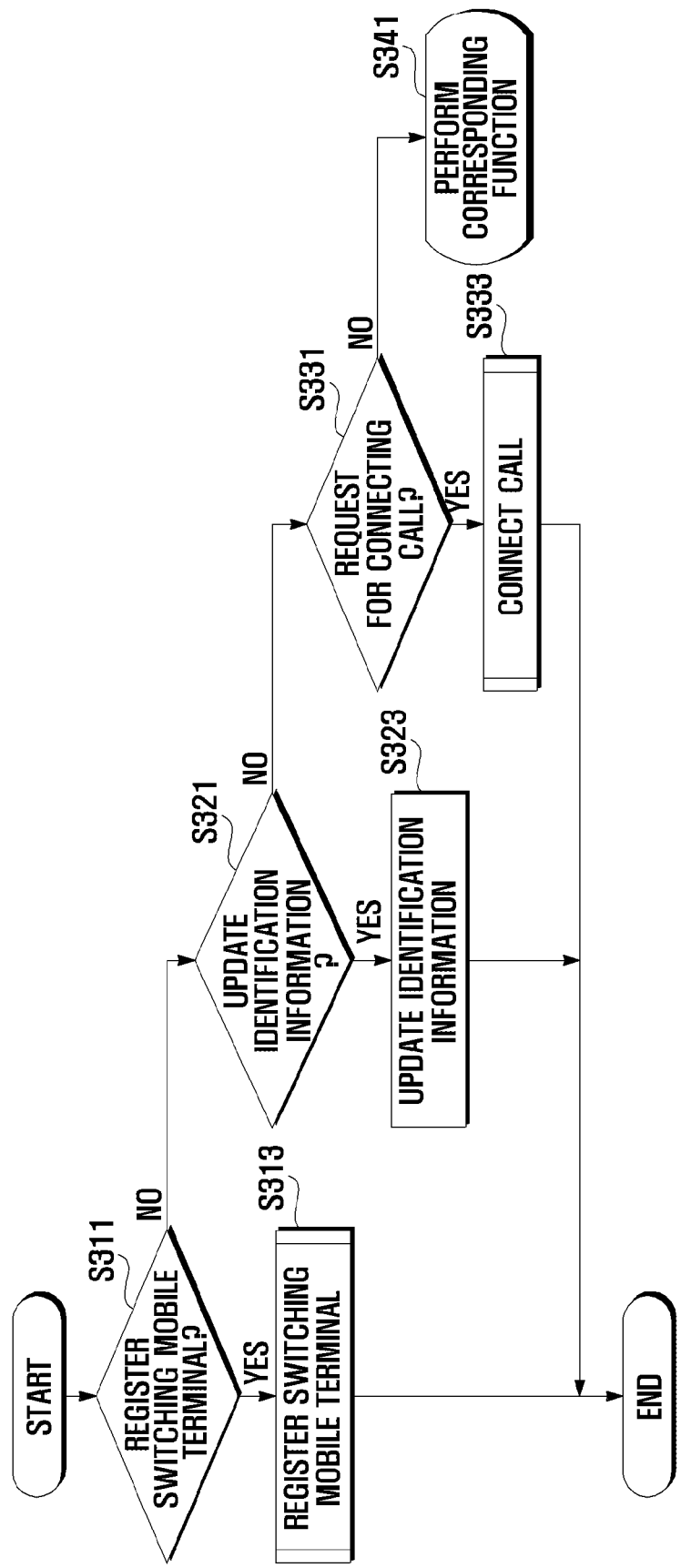
FIG. 3 is a flowchart illustrating an exemplary process of managing identification information and connecting a call in the first mobile terminal in the method of FIG. 1.

FIG. 3 is a flowchart illustrating an exemplary process of managing identification information and connecting a call in the first mobile terminal 100a in the method of FIG. 1.

Referring to FIG. 3, the controller 230 of the first mobile terminal 100a determines whether a request for registering the switching mobile terminal is input in step S311. If a request for registering the switching mobile terminal is input, the controller 230 registers the switching mobile terminal in step S313. For example, after specific identification information is selected, if a menu or a key for registering the switching mobile terminal is selected, the controller 230 registers the switching mobile terminal using the selected identification information. That is, the controller 230 may register the switching mobile terminal to enable sharing of a plurality of identification information in the identification information database stored in the memory unit 220.

Figure 4:
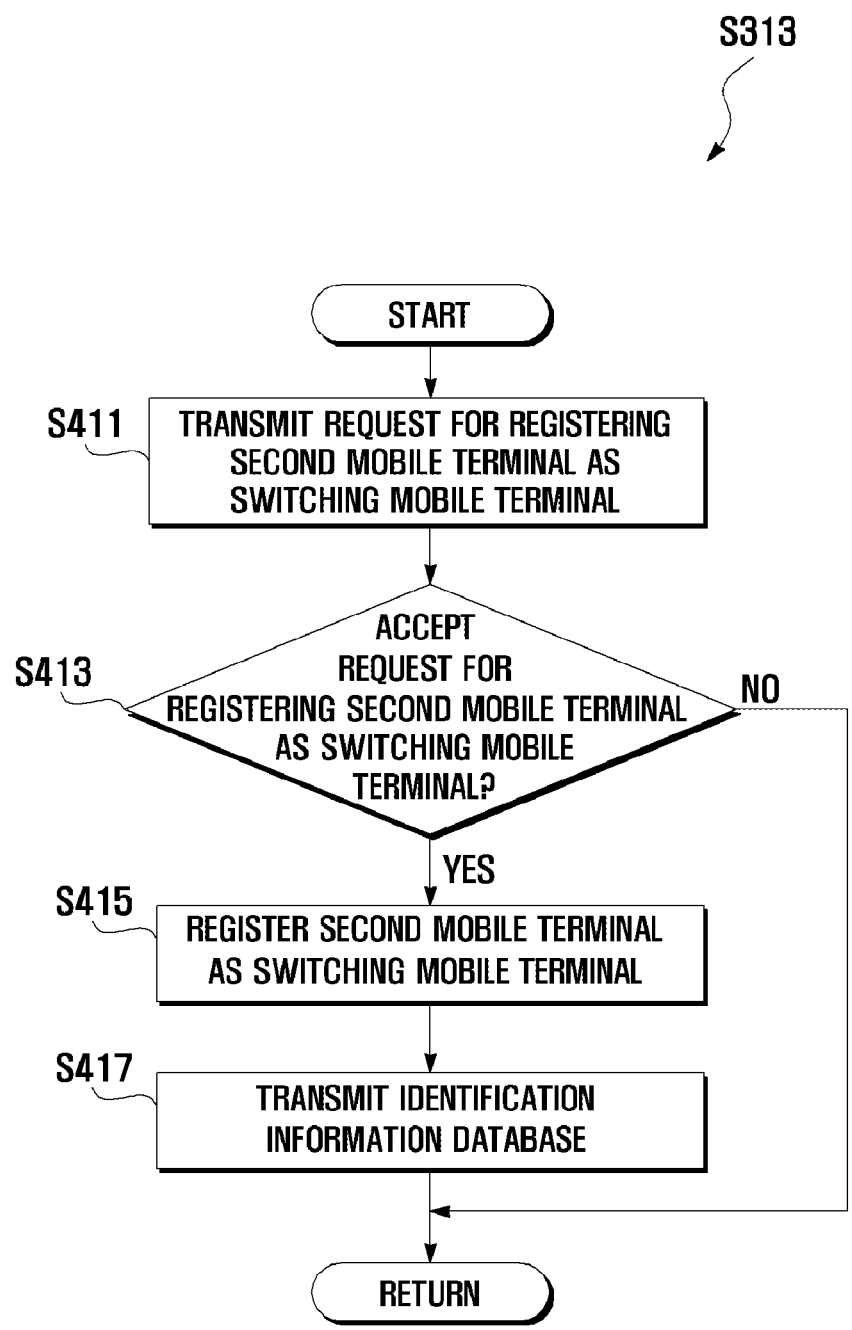
FIG. 4 is a flowchart illustrating an exemplary operation of registering a switching mobile terminal in the process of FIG. 3.

FIG. 4 is a flowchart illustrating an exemplary operation of registering a switching mobile terminal of step S313 in the process of FIG. 3.

Referring to FIG. 4, the controller 230 transmits a request to the second mobile terminal 100b for registering the second mobile terminal 100b having specific identification information as a switching mobile terminal in step S411. The request for registering the second mobile terminal 100b as a switching mobile terminal includes identification information of the first mobile terminal 100a.

The controller 230 determines whether the request for registering the second mobile terminal 100b as a switching mobile terminal is accepted by the second mobile terminal 100b in step S413.

If the request for registering the second mobile terminal 100b as a switching mobile terminal is accepted, the controller 230 registers the second mobile terminal 100b as the switching mobile terminal in step S415. For example, if a registration acceptance message is received from the second mobile terminal 100b in response to the request for registering, the controller 230 registers the second mobile terminal 100b as the switching mobile terminal. The controller 230 may then store the identification information of the switching mobile terminal to be mapped to a switch request key of the key input unit 260. The controller 230 transmits the identification information database to the switching mobile terminal in step S417 and the process then returns to the process of FIG. 3 and terminates therein.

In contrast, if the request for registering the second mobile terminal 100b as a switching mobile terminal is not accepted at step S413, for example if a registration refusal message is received from the second mobile terminal 100b in response to the registration request message, the process returns to the process of FIG. 3 and terminates therein.

Here, the controller 230 performs the process of registering a switching mobile terminal using a mobile communication technology, however the process is not limited thereto. In another exemplary embodiment, the controller 230 may perform the process of registering a switching mobile terminal using a local area communication technology or a short range communication technology. Examples of the local area communication technology include ZigBee and Ultra Wideband (UWB), and examples of the short range communication technology include Bluetooth and infrared communication. By forming a local area or short range communication channel and transmitting and receiving a signal, the controller 230 may perform the process of registering the switching mobile terminal.

Returning back to FIG. 3, if a request for registering the switching mobile terminal is not input at step S311, the controller 230 determines whether a request for updating identification information is input in step S321.

If a request for updating identification information is input, the controller 230 updates the identification information stored in the memory unit 220 in step S323. That is, the controller 230 adds received identification information to the memory unit 220, or adjusts or deletes at least a part of identification information previously stored in the memory unit 220. When the controller 230 updates the identification information, an identification information database is not updated. That is, the controller 230 manages update information generated when updating the identification information separately from the identification information contained in the identification information database. The memory unit 220 may further have an update information database including update information. That is, the controller 230 may store update information in the update information database.

If a request for updating identification information is not input at step S321, the controller 230 determines whether a request for connecting a call is input in step S331.

If a request for connecting a call is input, the controller 230 connects a call in step S333. Thereto, when a user selects a communication key, after selecting specific identification information, or after selecting a key to which specific identification information is mapped, the controller 230 connects a call to a mobile terminal corresponding to the specific identification information. When a switching call request key is selected, the controller 230 connects a call to the switching mobile terminal. Alternatively, when the user selects a switching call request key, or when the user selects a communication key after selecting identification information of the switching mobile terminal, the controller 230 connects a call to the switching mobile terminal.

Figure 5:
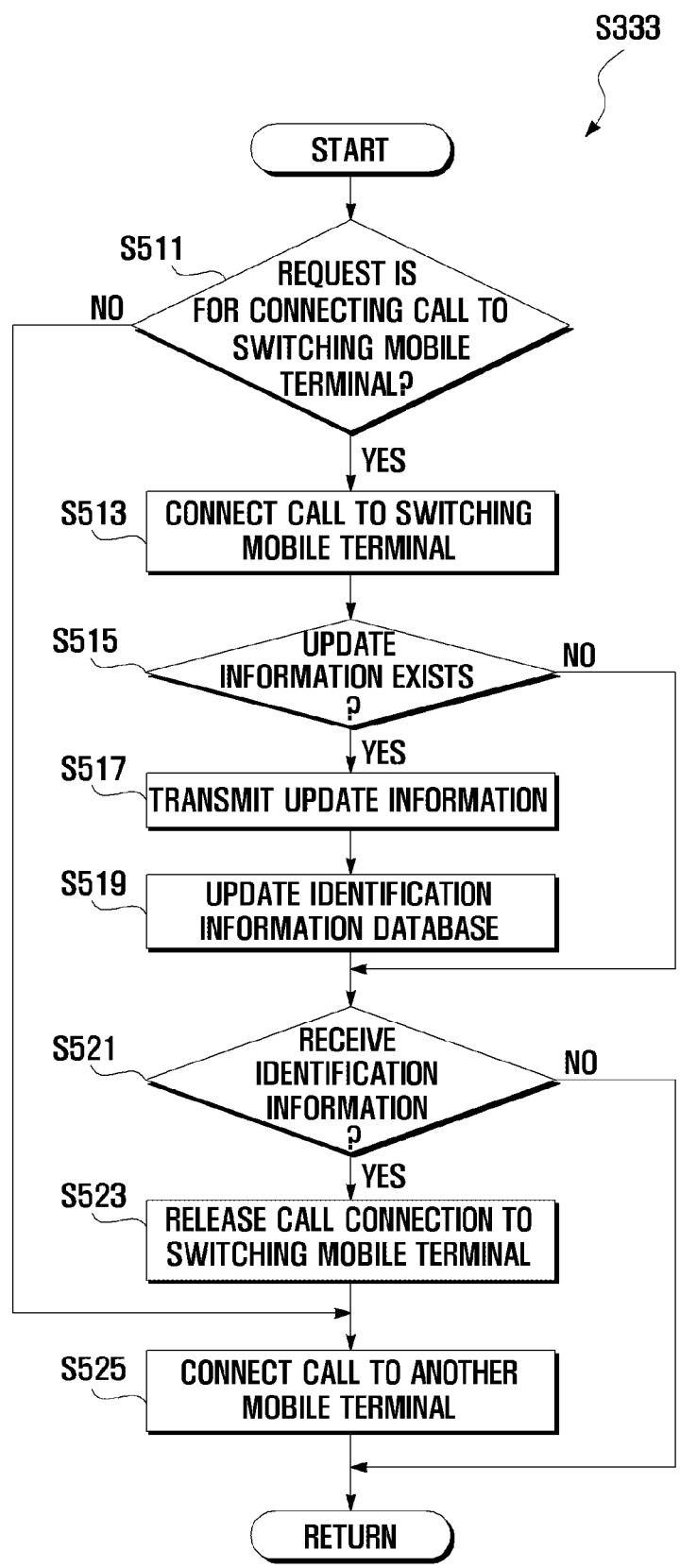
FIG. 5 is a flowchart illustrating an exemplary operation of connecting a call in the process of FIG. 3.

FIG. 5 is a flowchart illustrating an exemplary operation of connecting a call of step S333 in the process of FIG. 3.

Referring to FIG. 5, the controller 230 determines whether a request for connecting a call to the switching mobile terminal is input in step S511.

If a request for connecting a call to the switching mobile terminal is input, the controller 230 connects a call corresponding to input identification information in step S525 and the process then returns to the process of FIG. 3 and terminates therein.

In contrast, if a request for connecting a call to the switching mobile terminal is input at step S511, the controller 230 connects a call to the switching mobile terminal in step S513.

The controller 230 determines whether update information exists in the memory unit 220 in step S515. If the memory unit 220 includes an update information database, the controller 230 determines whether update information exists in the update information database.

If the update information exists, the controller 230 transmits the update information to the switching mobile terminal in step S517.

The controller 230 updates the identification information database using the update information in step S519. That is, the controller 230 adds identification information to the identification information database, or adjusts or deletes at least a part of the identification information of the identification information database. After updating the identification information database, the controller 230 removes and deletes the update information from the update information database.

The controller 230 determines whether identification information is received from the switching mobile terminal in step S521.

If identification information is received from the switching mobile terminal, the controller 230 releases the call connected to the switching mobile terminal in step S523.

The controller 230 then connects another call to a mobile terminal corresponding to the received identification information in step S525 and the process returns to the process of FIG. 3 and terminates therein.

If identification information is not received from the switching mobile terminal at step S521, the process returns to the process of FIG. 3 and terminates therein.

Returning back to FIG. 3, if a request for connecting a call is not input at step S331, the controller 230 performs a corresponding function in step S341. For example, the controller 230 may perform a message transmission and reception function, a wireless Internet function, a phonebook management function, a schedule management function, a navigation function, and the like.

Figure 6:
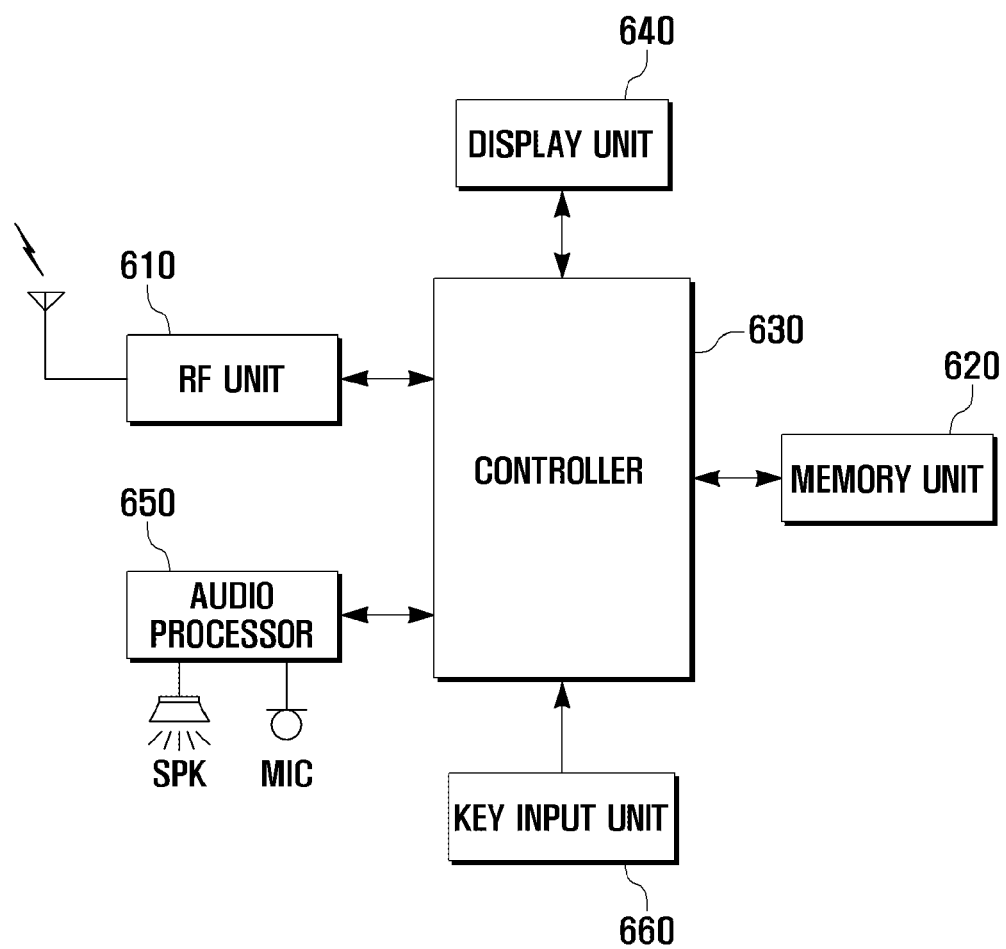
FIG. 6 is a block diagram illustrating a configuration of a second mobile terminal in a call switching system according to an exemplary embodiment of the present invention.

FIG. 6 is a block diagram illustrating a configuration of a second mobile terminal 100b in a call switching system according to an exemplary embodiment of the present invention.

In this exemplary embodiment, the second mobile terminal 100b denotes a mobile phone.

Referring to FIG. 6, the second mobile terminal 100b includes an RF unit 610, a memory unit 620, a controller 630, a display unit 640, an audio processor 650, and a key input unit 660. The configuration of the second mobile terminal 100b is similar to the first mobile terminal 100a and therefore a description thereof is omitted.

However, in the configuration of the second mobile terminal 100b, the memory unit 620 further stores programs for providing specific identification information to the providing mobile terminal. In this exemplary embodiment, the controller 630 controls an operation of the switching mobile terminal. That is, when a call is connected to the providing mobile terminal, the controller 630 controls to display a plurality of identification information of the identification information database. Further, when one of the plurality of identification information is selected, the controller 630 controls to transmit the selected identification information to the providing mobile terminal.

Figure 7:
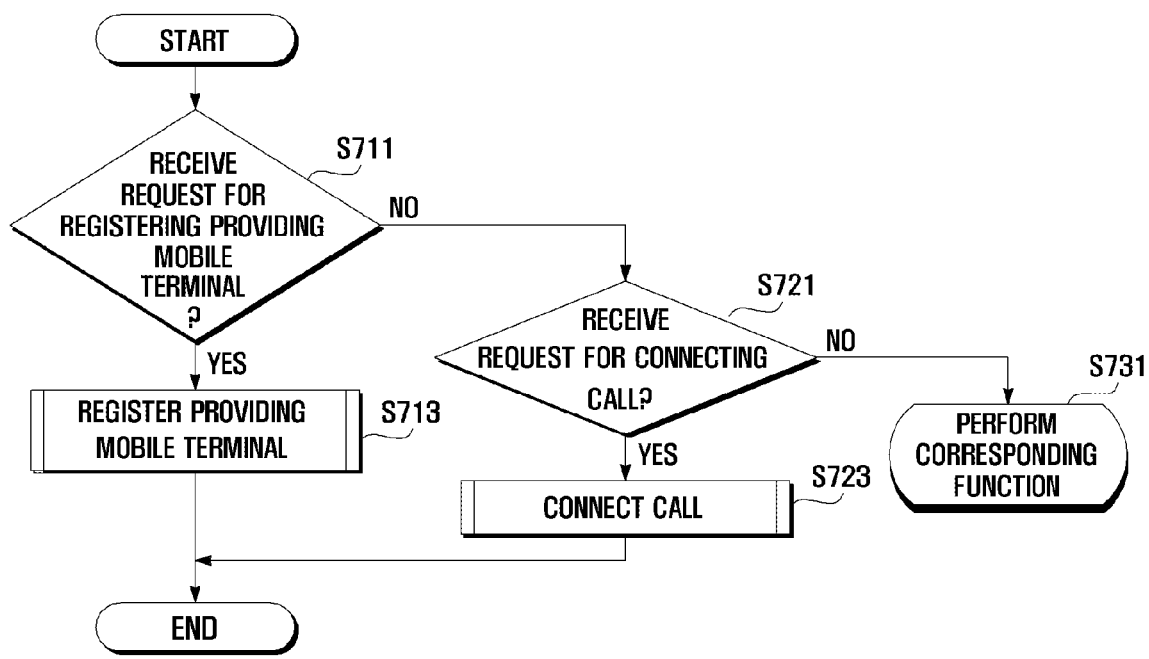
FIG. 7 is a flowchart illustrating an exemplary process of registering a providing mobile terminal and connecting a call in the second mobile terminal in the method of FIG. 1.

FIG. 7 is a flowchart illustrating a process of registering a providing mobile terminal and connecting a call in the second mobile terminal 100b in the method of FIG. 1.

Referring to FIG. 7, the controller 630 determines whether a request for registering a providing mobile terminal is received in step S711.

If a request for registering a providing mobile terminal is received, the controller 630 registers the providing mobile terminal in step S713. For example, when a request for registering a providing mobile terminal is received, the controller 630 controls to display a pop-up window for determining whether to accept the request for registering a providing mobile terminal. If the request for registering a providing mobile terminal is accepted while displaying the pop-up window, the controller 630 accepts the request and registers the providing mobile terminal. That is, the controller 630 registers a providing mobile terminal for providing identification information.

Figure 8:
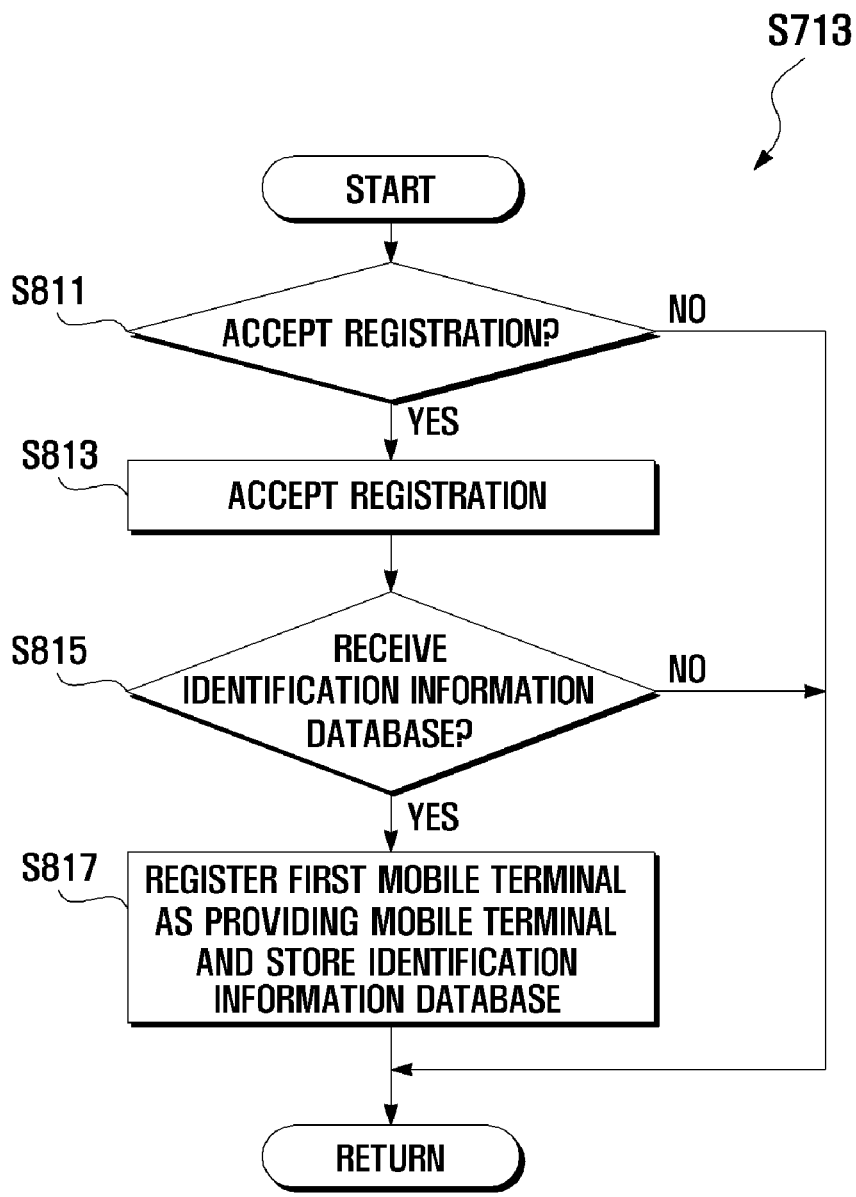
FIG. 8 is a flowchart illustrating an exemplary operation of registering a providing mobile terminal in the process of FIG. 7.

FIG. 8 is a flowchart illustrating an exemplary operation of registering a providing mobile terminal of step S713 in the process of FIG. 7.

Referring to FIG. 8, when a request for registering a providing mobile terminal is received from the first mobile terminal 100a, the controller 630 determines whether to accept a registration in step S811. For example, if a registration request message is received, the controller 630 determines whether to accept a registration.

If a registration is accepted, the controller 630 accepts a registration of the first mobile terminal 100a as a providing mobile terminal in step S813. For example, the controller 630 transmits a registration acceptance message to the first mobile terminal 100a using identification information of the registration request message.

The controller 630 determines whether the identification information database is received from the first mobile terminal 100a in step S815.

If the identification information database is received the first mobile terminal 100a, the controller 630 accepts a registration of the first mobile terminal 100a as a providing mobile terminal and stores the identification information database in step S817 and the process returns to the process of FIG. 7 and terminates therein.

If a registration is not accepted at step S811, or if the identification information database is not received at step S815, the process returns to the process of FIG. 7 and terminates therein. For example, the controller 630 transmits a registration refusal message to the first mobile terminal 100a using identification information of the registration request message.

Here, the controller 630 performs the process of registering a providing mobile terminal using a mobile communication technology, however the process is not limited thereto. In another exemplary embodiment, the controller 630 may perform the process of registering a providing mobile terminal using a local area communication technology or a short range communication technology. Examples of the local area communication technology include ZigBee and UWB, and examples of the short range communication technology include Bluetooth and infrared communication. By forming a local area or short range communication channel and transmitting and receiving a signal, the controller 630 can perform the process of registering the providing mobile terminal.

Returning back to FIG. 7, if a request for registering a providing mobile terminal is not received at step S711, the controller 630 determines whether a request for connecting a call is received in step S721.

If a request for connecting a call is received, the controller 630 connects a call between the switching mobile terminal and the providing mobile terminal in step S723. To connect the call to the providing mobile terminal, the controller 630 can provide specific identification information for connecting the call to the providing mobile terminal.

Figure 9:
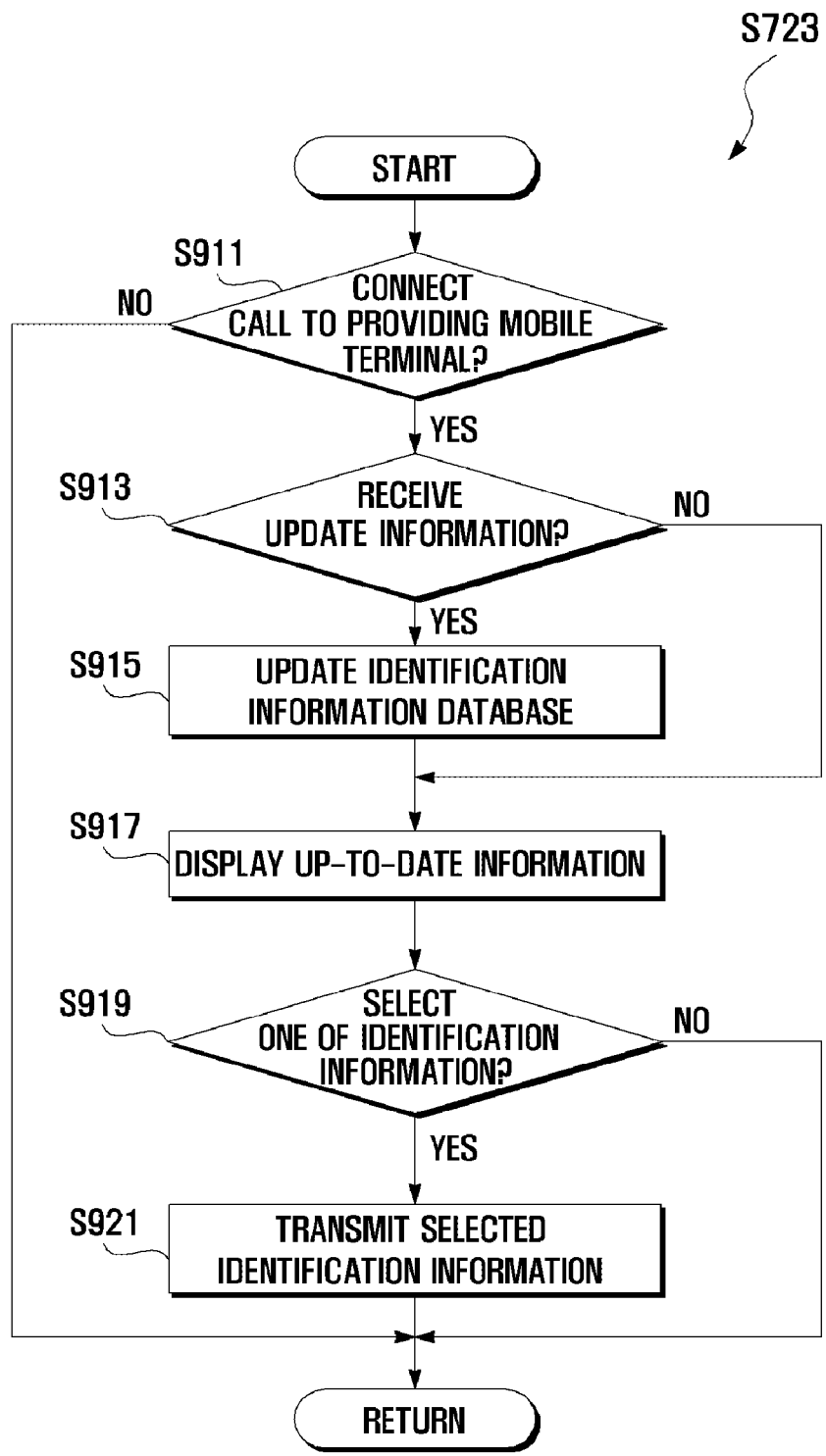
FIG. 9 is a flowchart illustrating an exemplary operation of connecting a call in the process of FIG. 7.

FIG. 9 is a flowchart illustrating an exemplary operation of connecting a call of step S723 in the process of FIG. 7.

Referring to FIG. 9, the controller 630 determines whether a call is connected to the providing mobile terminal in step S911.

If a call is not connected to the providing mobile terminal, the process returns to the process of FIG. 7 and terminates therein.

In contrast, if a call is connected to the providing mobile terminal at step S911, the controller 630 determines whether update information is received from the providing mobile terminal in step S913.

If update information is received, the controller 630 updates the identification information database using the update information in step S915. That is, the controller 630 adds identification information to the identification information database, or adjusts or deletes at least a part of the identification information database.

If update information is not received at step S913, or after updating the identification information database at step S915, the controller 630 controls to display the up-to-date information of the identification information database in step S917.

The controller 630 determines whether one of the plurality of identification information is selected in step S919.

If one of the identification information is selected, the controller 630 transmits the selected identification information to the providing mobile terminal in step S921 and the process returns to the process of FIG. 7 and terminates therein.

Returning back to FIG. 7, if a request for connecting a call is not received at step S721, the controller 630 performs a corresponding function in step S731. For example, the controller 630 may perform a message transmission and reception function, a wireless Internet function, a phonebook management function, a schedule management function, a navigation function, and the like.

Therefore, in the call switching system of exemplary embodiments, the first mobile terminal may connect a call to the third mobile terminal through the second mobile terminal. That is, even if a user of the first mobile terminal does not select a key for selecting identification information of the third mobile terminal, the first mobile terminal may connect a call to the third mobile terminal.

In exemplary embodiments, when the first mobile terminal registers the second mobile terminal as the switching mobile terminal, the first mobile terminal transmits the identification information database to the second mobile terminal. However the present invention is not limited thereto. In another exemplary embodiment, the first mobile terminal may transmit the identification information database to the second mobile terminal separately from a process of registering the switching mobile terminal. For example, after the first mobile terminal registers the second mobile terminal as the switching mobile terminal, the first mobile terminal can later transmit the identification information database to the second mobile terminal when a call is first connected to the second mobile terminal. In this case, when receiving the identification information database, the second mobile terminal can store the identification information database. Thereafter, when a call from the first mobile terminal is again connected to the second mobile terminal, the first mobile terminal can transmit update information. In this case, the second mobile terminal can then update the identification information database using the received update information.

In exemplary embodiments, in order to perform an operation of connecting a call, the first mobile terminal registers the switching mobile terminal, however the present invention is not limited thereto. In another exemplary embodiment, a process of connecting a call can be performed without the first mobile terminal registering the switching mobile terminal. For example, when the first mobile terminal receives a request for connecting a call from the second mobile terminal, the first mobile terminal can display a pop-up window for determining whether to transmit the identification information database to the second mobile terminal. If a user of the first mobile terminal selects to transmit the identification information database to the second mobile terminal, after transmitting the identification information database to the second mobile terminal, when the first mobile terminal receives specific identification information from the second mobile terminal, the first mobile terminal can connect another call using the received identification information.

In exemplary embodiments, when the first mobile terminal updates the identification information, the first mobile terminal manages the update information separately from the identification information database, and then when a call from the first mobile terminal is connected to the second mobile terminal, the first mobile terminal transmits the update information. However the present invention is not limited thereto. In another exemplary embodiment, the identification information database is updated when the first mobile terminal updates the identification information. Alternatively, in another exemplary embodiment, the first mobile terminal does not transmit update information to the second mobile terminal when a call is connected from the first mobile terminal to the second mobile terminal. For example, when the first mobile terminal updates the identification information, the first mobile terminal can set and store the update date and update time point. When a call is connected to the second mobile terminal, the first mobile terminal can transmit the stored update date and update time point to the second mobile terminal. When the second mobile terminal receives the update date and updates time point, the second mobile terminal compares the newly received update date and updates time point with the most recently stored update date and update time point. If the newly received update date and update time point are different from the most recently stored update date and update time point, the second mobile terminal stores the newly received update date and update time point and requests update information to the first mobile terminal. Upon receiving the request for update information, the first mobile terminal transmits the update information to the second mobile terminal.

In exemplary embodiments, the second mobile terminal receives the identification information database from the first mobile terminal and retransmits identification information selected therefrom to the first mobile terminal. However the present invention is not limited thereto. In another exemplary embodiment, even if the identification information database is not received from the first mobile terminal, the second mobile terminal can transmit identification information selected from the previously stored identification information to the first mobile terminal.

As described above, according to exemplary embodiments of the present invention, in a call switching system, a mobile terminal can connect a call through another mobile terminal. Thereby, a user of the mobile terminal can easily connect a call even if the user does not remember the requisite identification information or if the requisite identification information is not stored in the mobile terminal. Further, the user of the mobile terminal can easily connect a call even if the user is not skillful at searching for identification information using a phonebook management function.

While the present invention has been shown and described with reference to certain exemplary embodiments thereof, it will be understood by those skilled in the art that various changes in form and details may be made without departing the spirit and scope of the invention as defined in the appended claims and their equivalents.

What is claimed is:

1. A method of connecting a call in a call switching system having a plurality of mobile terminals each having individual identification information for connecting a call, the method comprising:
   displaying, by a second mobile terminal, when a call is connected between a first mobile terminal and the second mobile terminal, identification information previously stored on the second mobile terminal;
   transmitting, by the second mobile terminal, if one of the displayed identification information is selected, the selected identification information to the first mobile terminal;
   releasing, by the first mobile terminal, when the selected identification information is received, the connected call; and
   connecting another call using the received identification information.

2. The method of claim 1, further comprising:
   transmitting, by the first mobile terminal, a plurality of identification information stored in the first mobile terminal to the second mobile terminal; and
   storing, by the second mobile terminal, when the plurality of identification information is received, the received identification information.

3. The method of claim 2, further comprising:
   determining, by the second mobile terminal, whether a request for registering a switching mobile terminal is received from the first mobile terminal; and
   receiving, by the first mobile terminal, a registration acceptance message from the second mobile terminal in response to the request for registering.

4. The method of claim 3, further comprising registering, by the first mobile terminal, the second mobile terminal as a switching mobile terminal for providing stored identification information,
   wherein the transmitting, by the first mobile terminal, of the plurality of identification information to the second mobile terminal is performed when registering the switching mobile terminal.

5. The method of claim 4, further comprising mapping the identification information of the switching mobile terminal to a switch request key of the first mobile terminal.

6. The method of claim 4, further comprising:
   determining, by the first mobile terminal, when the call between the first mobile terminal and the second mobile terminal is connected, whether at least a part of the plurality identification information stored in the first mobile terminal is updated;
   transmitting, by the first mobile terminal, if at least a part of the plurality of identification information is updated, update information of the updated identification information to the second mobile terminal; and
   updating, by the second mobile terminal, when the update information is received, the identification information stored in the second mobile terminal using the update information.

7. A method of connecting a call in a call switching system having a plurality of mobile terminals each having individual identification information for connecting a call, the method comprising:
   transmitting, by a first mobile terminal, when a call is connected between the first mobile terminal and a second mobile terminal, a plurality of identification information stored in the first mobile terminal to the second mobile terminal;
   storing, by the second mobile terminal, when the plurality of identification information is received, the received identification information;
   displaying, by the second mobile terminal, the stored identification information;
   transmitting, by the second mobile terminal, if one of the displayed identification information is selected, the selected identification information to the first mobile terminal; and
   releasing, by the first mobile terminal, when the selected identification information is received, the connected call and connecting another call using the received identification information.

8. The method of claim 7, wherein the transmitting, by a first mobile terminal, of the plurality of identification information to the second mobile terminal comprises:
   determining, by the first mobile terminal, when a call is connected to the second mobile terminal, whether at least a part of the plurality identification information is updated; and
   transmitting, by the first mobile terminal, if at least a part of the plurality of identification information is updated, update information of the updated identification information to the second mobile terminal.

9. The method of claim 8, wherein the storing, by the second mobile terminal, of the received identification information comprises updating, by the second mobile terminal, when the update information is received, the identification information stored in the second mobile terminal using the update information.

10. The method of claim 7, further comprising registering, by the first mobile terminal, the second mobile terminal as a switching mobile terminal for providing the identification information.

11. The method of claim 10, further comprising mapping the identification information of the switching mobile terminal to a switch request key of the first mobile terminal.

12. The method of claim 10, wherein the registering of the second terminal as a switching mobile terminal comprising using at least one of a local area communication technology and a short range communication technology.

13. A call switching system having a plurality of mobile terminals each having individual identification information for connecting a call, the system comprising:
- a first mobile terminal for releasing, when a call is connected to a second mobile terminal, if identification information is received from the second mobile terminal, connection of the call and for connecting another call using the received identification information;
- the second mobile terminal for displaying, when the call is connected to the first mobile terminal, identification information previously stored on the second mobile terminal, and for transmitting, if one of the displayed identification information is selected, the selected identification information to the first mobile terminal; and
- a third mobile terminal for connecting the other call from the first mobile terminal.

14. The system of claim 13, wherein the first mobile terminal registers the second mobile terminal as a switching mobile terminal for providing the previously stored identification information.

15. The system of claim 14, wherein the first mobile terminal maps the identification information of the switching mobile terminal to a switch request key.

16. The system of claim 14, wherein when the first mobile terminal registers the second mobile terminal as the switching mobile terminal, the first mobile terminal transmits a plurality of identification information stored in the first mobile terminal to the second mobile terminal; and
when the second mobile terminal receives the plurality of identification information, the second mobile terminal stores the received identification information.

17. The system of claim 16, wherein when the call is connected between the first mobile terminal and the second mobile terminal, the first mobile terminal determines whether at least a part of the plurality of identification information is updated and transmits, if at least a part of the plurality of identification information is updated, update information of the updated identification information to the second mobile terminal; and
the second mobile terminal updates, when the update information is received, the identification information stored in the second mobile terminal using the update information.

18. A call switching system having a plurality of mobile terminals each having individual identification information for connecting a call, the system comprising:
- a first mobile terminal for storing a plurality of identification information, for transmitting, when a call is connected to a second mobile terminal, the plurality of identification information, for releasing, when a selected one of the plurality of identification information is received from the second mobile terminal, connection of the call, and for connecting another call using the received identification information;
- the second mobile terminal for storing and displaying, when the call is connected to the first mobile terminal, the plurality of identification information received from the first mobile terminal, and for transmitting, if one of the displayed identification information is selected, the selected identification information to the first mobile terminal; and
- a third mobile terminal for connecting the other call from the first mobile terminal.

19. The system of claim 18, wherein when the call is connected between the first mobile terminal and the second mobile terminal, the first mobile terminal determines whether at least a part of the plurality of identification information is updated and transmits, if at least a part of the plurality of identification information is updated, update information of the updated identification information to the second mobile terminal.

20. The system of claim 19, wherein the second mobile terminal updates, when the update information is received, the identification information stored in the second mobile terminal using the update information.

21. The system of claim 18, wherein the first mobile terminal registers the second mobile terminal as a switching mobile terminal for providing the stored identification information.

* * * * *